May 22, 1962
R. TEUCHER
3,035,480
METHOD FOR THE OBJECTIVE INDICATION OF THE
SHAPE AND SIZE OF WORKPIECES
Filed July 16, 1958
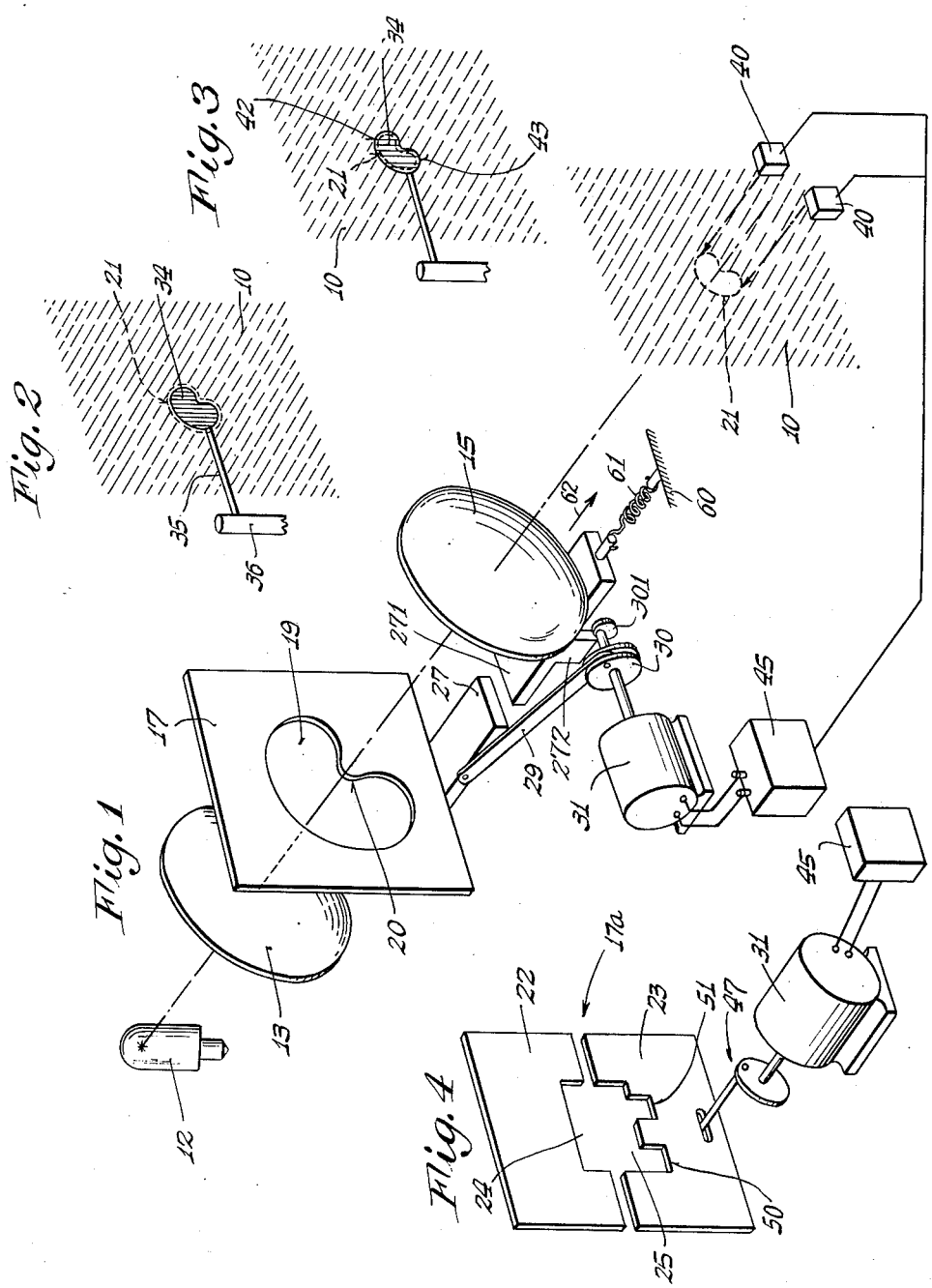
INVENTOR.
Rudolf Teucher
BY
Munn, Liddy, Daniels & March
ATTORNEYS United States Patent Office 3,035,480
Patented May 22, 1962

3,035,480
METHOD FOR THE OBJECTIVE INDICATION OF THE SHAPE AND SIZE OF WORKPIECES
Rudolf Teucher, Hofheim (Taunus), Germany, assignor to Alfred Gauthier, G.m.b.H., Calmbach (Enz), Germany, a corporation of Germany
Filed July 16, 1958, Ser. No. 748,872
Claims priority, application Germany July 19, 1957
3 Claims. (Cl. 88—14)

This invention relates to methods for effecting objective measurements or indications of the shape and size of workpieces, and also to devices by which the said methods of the invention may be carried out.

Heretofore it has been well known to use various gauges for the purpose of checking or gauging the dimensions of workpieces, such gauges embracing different kinds of measuring tools, indicators, dials and the like. From a practical standpoint the use of such gauges and the measuring procedures associated therewith are limited, particularly where it is desired to make a 100% check of large quantities of small and miniature workpieces, which for example must be measured or gauged at different points and which may have complicated profiles or configurations.

The use of measuring or profile projectors, for testing the profiles of differently shaped small workpieces is also well-known. However, when using such projectors the comparison of the shape of the profile which is to be tested and the correct profile is of a subjective nature. Such subjective tests are also utilized in the well-known procedure of testing turned parts, using projection by a light slot.

The disadvantage which is attendant the subjective nature of the above tests is obviated by the present invention, and one object of the invention is to provide a novel and improved method for objectively measuring or gauging workpieces, particularly workpieces of small dimension, as by obtaining indications of the size and shape of the same, and further to provide such a method which may be automatically carried out.

In accomplishing the above object the invention provides for a method and apparatus which utilize a cyclic variation of the size of the gauging instrumentality. That is, the gauge which is used has its size periodically varied or changed in accordance with a given frequency, and a workpiece which is to be measured or gauged is disposed closely adjacent the said gauge whose size is being periodically varied or changed. The method of the invention further involves the establishing and use of predetermined times or time intervals in the cycles of the gauge variation, at which times there is intended to exist a coincidence between given corresponding points on the gauge and on the workpiece, when the workpiece is accurately made. Such corresponding points may be selected at will as to their specific location, and as to their number.

Other features and advantages will hereinafter appear.

In the drawings accompanying this specification, similar characters of reference are used to designate like components throughout the several views, in which:

FIGURE 1 is a perspective diagrammatic representation of one type of apparatus by which the method of the invention is carried out.

FIGURE 2 is a perspective representation of a workpiece mounting means with inserted workpiece. In the plane of the workpiece the projected image of a gauge is shown, this image being larger than the workpiece.

FIGURE 3 is a view like FIG. 2, showing the optical image as smaller than the workpiece.

FIGURE 4 is a perspective diagrammatic representation of a portion of a different apparatus for carrying out the invention.

One of the important advantages of the method as provided by the invention resides in the fact that an objective measuring or gauging and control of a workpiece of any special size and shape may be effected at any point at its profile, with a very high degree of accuracy. This important advantage is obtainable by virtue of the fact that the required measuring value is directly correlated to specific times or time-intervals in the cycles of the gauge variation; that is, it becomes a function of time. Thus, the gauging or testing of the workpiece profile is made with reference to time measurements, which in turn can be effected with a very high accuracy.

In carrying out the invention further an unexpected and distinct advantage is had especially with regard to an automatic testing procedure, by constituting the said gauge which changes its size periodically as either an enlarged or reduced projected image of a master gauge member. For obtaining such an image well-known, suitable optical means may serve. The image is effected in such a way that the configuration of the gauge is produced exactly in the plane of the workpiece profile to be checked. Moreover, the arrangement of the cycling and the size of the gauge, whether enlarged or diminished, is such that during portions of each cycle the projected image constituting the gauge is larger than the workpiece itself, so that it periodically overlaps the workpiece profile. Such overlapping would then normally occur once in each cycle of the periodic change or fluctuation in the size of the gauge.

By the above method it is possible to effect a quick and accurate test of the shape and size of any profile of workpieces, even those which have a most complicated configuration. With the present method it is not necessary physically to touch the workpieces during the gauging procedure, and therefore they cannot be adversely influenced in the least by the taking of the measurements as regards their profiles, surface finishes and the like. That is, no physical contact or engagement is necessary between the workpiece and a measuring stylus or probe, since only the oscillating projected image constituting the gauge need be associated with the edges of the profile which are to be tested; the required measurements or indications are obtained at the moment or moments when coincidence is intended to exist between corresponding points on the profile of the workpiece being tested and the gauge image. Thus, the method as provided by the invention facilitates and makes possible an objective measurement of workpieces with a high degree of accuracy, especially small or delicate workpieces, and the said method of determining the dimensions or values is readily adaptable to an automatic checking or gauging procedure. In obtaining such automatic gauging or checking of the workpieces the latter are fed, as by any suitable automatic feeding device, into the plane, in which the oscillating projected image of the master gauge is produced, and after the gauging has been completed the workpieces are discharged and piloted by automatic feeding or conveying devices, as determined by the results obtained by the gauging procedure. Such results, as already mentioned above, involve time values in consequence of any appreciable overlapping of the workpiece profile by the projected gauge image. Well-known means, moreover, may be employed to effect such piloting in response to preset time values, such means for example comprising electronic counters where a preselection of figures is possible.

Also, in accordance with the present invention, the method as above described may be readily carried out in an advantageous manner by relatively simple equipment, as follows: The master gauge which is utilized to produce the projected gauging image may be in the form of a thin diaphragm, and an optical projection system may be provided in conjunction with such diaphragm, together with means by which the diaphragm and/or a portion of the optical system is made to oscillate. Changes in the position of the diaphragm and parts of the optical system in the direction of the optical axis of the latter are made to effect changes in the size of the projected image of the master gauge member, by this the projected image always remains in the plane of the workpiece profile to be checked.

For the purpose of indicating in a simple and reliable manner when the gauge comprising the optical image overlaps the profile or configuration of the workpiece and extends beyond the confines thereof, thereby to enable automatic checking or gauging to be carried out, photoelectric or photo-sensitive light receiving devices may be coordinated or correlated with those points of the workpiece profile which are to be measured or tested. The said photo-sensitive receivers are connected with an electronic control device which is provided for the purpose of effecting a time-correlation or synchronization between the moment, in which with periodic change of the image of the gauge a coincidence between the workpiece and the image of the gauge is obtained and thus the photo-sensitive receivers are either illuminated or shaded at a certain moment of the periodic change in size of the image of the gauge. Such a reference moment may be for instance that, in which the image of the gauge discloses its smallest size.

The said photo-sensitive receivers moreover may be located at a distance from the workpiece and thus also from the image plane of the gauge, thereby to facilitate the arrangement of the light receivers, particularly where workpieces of small dimensions are involved. Such organization provides greater flexibility of the apparatus, since it enables the checking of different kinds of workpieces, whether large or small. To direct the light rays which overlap the workpiece and are intended to energize the photo-sensitive receiver, well-known optical picture systems may be utilized, as is readily understood.

Compared with prior, well-known devices for measuring the shape and size of workpieces, the method as provided by the present invention and the devices by which the method is carried out possess the important advantage that objective tests may be obtained with all kinds of workpieces having profiles or configurations which are to be gauged, said objective tests making possible quantitative specifications of the said workpieces. There is thus made possible, by the method and apparatus of the invention, the automation of the measuring and gauging operations involving, for instance, the control of various tolerances as established in interchangeable manufacturing practice.

Moreover, it will be understood that the master gauging member may be of relatively large size, with the projected gauging image greatly reduced, as required by the sizes of the workpieces; or, the master gauging member may be smaller, and the projection may be effected in a manner that the projected image is larger than the master gauge itself. The circumstances involved with the sizes of the workpieces and the necessary measurements which are to be checked will normally determine the type and degree of projection, as may be readily understood.

Several specific embodiments of the invention are illustrated in the figures. Referring first to FIG. 1 there is indicated a plane 10. I provide an optical system and a gauge member associated with such system, whereby a projected image may be produced in the plane 10. This image may constitute and function as a gauge, for obtaining objective indications of the shape and size of workpieces. This optical system may comprise a source of light, as for example an incandescent bulb 12, a condensing lens 13 arranged to collect and intensify or concentrate the light from the bulb 12, and a projection lens 15 arranged to receive the condensed rays from the light source and to produce an image in the plane 10 according to the explanations given below.

Interposed between the condensing lens 13 and projecting lens 15 I provide a gauge member 17 which is preferably of opaque material such as thin sheet metal or the like, said gauge member being thus in the nature of a diaphragm and having a cutout portion or opening 19 which has the exact configuration, except perhaps for size, of the workpieces which are to be gauged. As shown herein, the cutout or opening 19 is of oval or lozenge shape, with an indentation 20 disposed at one side. It will be understood, however, that the opening 19 may have any regular or irregular configuration, depending on the exact shape and nature of the workpieces which are to be gauged.

For example, in FIG. 4 there is shown a two-piece gauge plate 17a having an upper portion or member 22 and a lower portion or member 23 provided with cutouts or notches 24 or 25 respectively, said notches cooperating with each other to outline a gauging opening of irregular configuration which is seen to be quite different from the opening 19 in the gauge plate 17. Other shapes may also be utilized, depending on the particular task or gauging operation which is to be performed.

Referring again to FIG. 1, it will be readily understood that the optical system comprising the bulb 12 and lenses 13 and 15 together with the gauging member 17 may be so arranged as to project in plane 10 an image 21 formed by light rays, said image being greatly reduced with respect to the size of the opening 19 in the gauge member.

In accordance with this invention, I further provide means by which the gauge member 17 and projecting lens 15 may be oscillated in the direction of the optical axis of the projection lens, and that in such a way that the projection image is always produced in plane 10. As shown, the gauge member 17 and lens 15 may be mounted on a carrier strip each 27 or 271 resp. which may be supported for longitudinal sliding movement by suitable bearing means (not shown). The oscillation of the mounting strips 27 and 271 and thus of gauge 17 and the projecting lens 15 may be accomplished by any suitable mechanism. To exemplify such oscillating mechanism there is shown a pivoted link member 29 connected to the mounting strip 27 and to a crank wheel 30 which is powered by an electric motor 31 of the synchronous type, for example. Furthermore on the axis of motor 31 an eccentric 301 is arranged, which rests against stop 272 provided at mounting strip 271. The latter is influenced by spring 61 provided at it and at a firm support 60. Said spring tries to pull the mounting strip in direction of arrow 62. It is to be easily understood, that a turning movement of the axis of the motor through wheel 30 and through eccentric 31 effects an oscillating movement of mounting strips 27 and 271 with a frequency as determined by the characteristics of the motor 31. Thus by corresponding relative arrangement of crank wheel 30 and eccentric 301, the oscillating movement of the two mounting strips 27 and 271 are chosen in such a way, that the latter and thus the gauge member 17 as well as the projecting lens 15 have always counter-running movement. Suitable execution of the eccentric 301 provides for that the shifting path of the projecting lens 15 represents only a part of the shifting path of gauge member 17. This fact as well as the counter-running movement of the two mounting strips 27 and 271 guarantee that the image 21 is always produced in plane 10.

Considering now FIGS. 2 and 3 the projected image 21 produced in plane 10 may be advantageously utilized for gauging purposes to determine departures in the size and shape of workpieces. For instance, a workpiece 34 is shown in FIGS. 2 and 3, mounted by means of a rod 35 and stanchion 36 so as to be arranged in the plane 10 of the projected image 21. In FIG. 2 the image 21 is shown as larger than the workpiece 34 whereby peripheral portions of the image extend beyond the border or periphery of the workpiece and are free to pass entirely the plane 10. In FIG. 3 the projected image 21 is shown as smaller than the workpiece 34, whereby no light which constitutes the projected image may pass the plane 10.

In accordance with the present invention the oscillations of the gauge member 17 and projecting lens 15 are such as to cause periodic variations in the size of the projected image 21, so that said image is periodically made larger than the workpiece (as illustrated in FIG. 2) and alternately periodically made smaller than the work piece (as shown in FIG. 3). During the cycling of the gauge member 17 and lens 15, and cycling of the projected image between its large and small sizes there is a particular time at which the projected image will have an intermediate size and shape which may be considered as exactly corresponding to or coinciding with an accurately formed and acceptable workpiece which conforms to all of the quality standards, dimensional tolerances and the like. Two such times will occur in each cycle or interval where the image proceeds from its smallest size through the said intermediate size to its largest size, and from the largest size through the intermediate size back again to its smallest size. During the first part of the cycle the image is increasing in size, whereas during the latter part of the cycle the image is decreasing in size. If now a gauging indication is made at these two times when the image is of intermediate size and representative of an accurately formed, acceptable workpiece, then any deviations of the workpiece from the accurate image could be made to show up, and this would give an indication of the quality and acceptability of the workpiece.

For example, at times slightly beyond those predetermined times at which coincidence would be established between the workpiece and the projected image, light rays could extend past or beyond the workpiece and strike the photosensitive receivers 40. If such light does not extend past and strike the receivers, then the workpiece is holding back the light because it is oversize, and suitable action can be taken accordingly in piloting such oversize work.

I further provide means by which such periodic comparison and indications or measurements of the projected image and the workpiece may be readily and accurately effected, twice in each of the said cycles. Referring again to FIG. 1, a plurality of photoelectric or photo-sensitive devices 40 may be provided, arranged so as to be responsive to light which extends past the workpiece being gauged and which passes plane 10. In FIGURE 1 the photo-sensitive devices 40 are shown at a certain distance from plane 10 for reason of clearness, whereas in actuality they may be arranged close to that plane. If, however, a workpiece has comparatively small dimensions it is possible, as mentioned above, to arrange the photo-sensitive receivers at a certain distance from plane 10 in which case the light may be directed to them expediently by well-known optical projection systems. In case of such an arrangement, the photo-sensitive receivers may not only be arranged beyond the plane 10 but they may be arranged before the plane, too.

The photo-sensitive devices 40 may be so arranged that each one monitors or measures a particular dimension or peripheral portion of the workpiece 34. For example, the upper one of the photo-sensitive devices 40 may be arranged to gauge or monitor a point 42 on the periphery of the workpiece 34, and the lower one of the photo-sensitive devices 40 may be arranged to monitor or gauge a point 43 on the workpiece 34, as indicated in FIG. 3.

To obtain time relation between the illuminating or shading of the photo-sensitive devices 40, which represents the consequence of the coincidence between the workpiece and the image of the gauge, and a certain moment of the change in the size of the image of the gauge and thus of the oscillating movements of the gauge member 17 and the projecting lens 15, an electronic control means 45 is arranged. On the one hand this device is connected with the synchronous motor 31 and on the other hand with the photo-sensitive devices 40. It comprises a well-known electronic chronometer. The start of said chronometer is determined in dependence on a certain phase situation of image 21 and thus on a certain angular position of the turning axis of synchronous motor 31, whereas the time measuring is stopped by the illuminating or shading of the photo-sensitive devices 40 caused by the coincidence between the image of the gauge and the workpiece.

Another embodiment of the invention by which the size of the projected light image in plane 10 may be varied periodically in accordance with a given frequency, using a different organization or structure, is illustrated in FIG. 4. In this figure, the gauge plate 17a is constituted of a stationary portion 22 and a vertically movable portion 23, the latter being oscillated by means of a crank drive mechanism 47 with the synchronous motor 31. The motor 31 is shown as connected with the electronic control device 45, similar to the organization illustrated in FIG. 1.

It will be understood that the gauge plate 17a, namely the segment 23, may be vertically oscillated, thereby to increase or decrease the size of the projected image in plane 10. The plate 23 may be so arranged that it will provide gauging points 50 and 51 on the projected image, which points may then be monitored by the photo-sensitive devices 40.

With the arrangement of FIG. 4 it will be understood that only dimensions which are essentially parallel to each other may be readily checked, whereas with the oscillating arrangement illustrated in FIG. 1 any desired peripheral portions of the image may be utilized for gauging purposes since the entire image is uniformly enlarged and reduced in response to the cycling procedure. With the organization of FIG. 4 the projected image will be made taller or shorter, but will not be made narrower or wider in a horizontal direction.

Variations and modifications may be made without departing from the spirit of the invention or the scope of the appended claims.

I claim:

1. The method of obtaining objective indications of the shape and size of workpieces, which includes the steps of bringing into proximity with each other a workpiece and an optical gauge whose size and shape correspond to the workpiece to be examined and whose size may be varied, periodically changing in accordance with a given frequency the size of said gauge, and utilizing the change in the size of the gauge to predetermine the time cycle of gauge size variation at which coincidence is effected between given corresponding points on the gauge and workpiece to obtain an objective indication of the size and shape of said workpiece.

2. The method as defined in claim 1, including the further step of producing said optical gauge from a gauge member of smaller size than the optical gauge.

3. The method as defined in claim 1, including the further step of producing said optical gauge from a gauge member of larger size than the optical gauge.

References Cited in the file of this patent

UNITED STATES PATENTS

| | | |
|---|---|---|
| 2,386,806 | Ledoux | Oct. 16, 1945 |
| 2,444,639 | Elder | July 6, 1948 |
| 2,670,650 | Wilmotte | Mar. 2, 1954 |
| 2,741,153 | Reason et al. | Apr. 10, 1956 |
| 2,812,685 | Vossberg | Nov. 12, 1957 |